No. 847,666. PATENTED MAR. 19, 1907.
C. J. KOENIG.
AUTOMATIC GLASS GATHERING AND BLOWING MACHINE.
APPLICATION FILED OCT. 20, 1905. RENEWED JAN. 24, 1907.
2 SHEETS—SHEET 2.
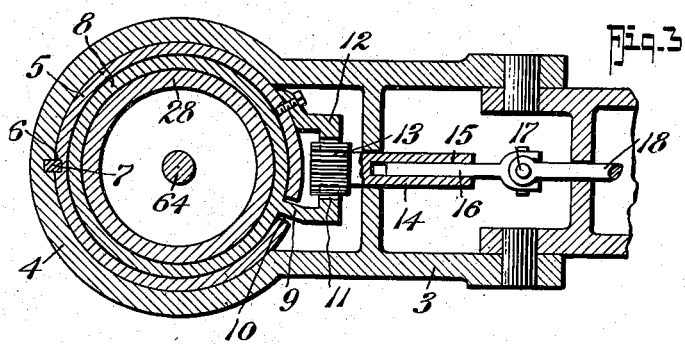
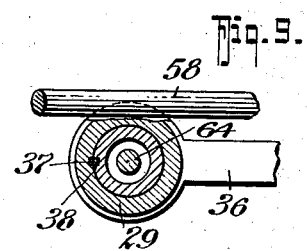
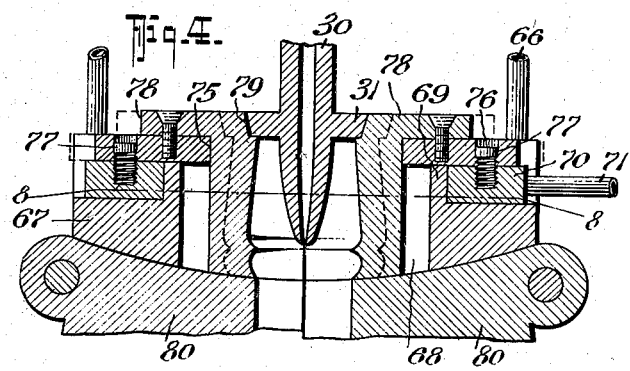
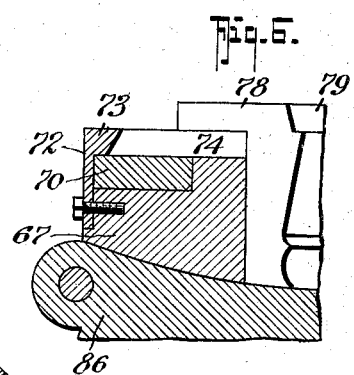
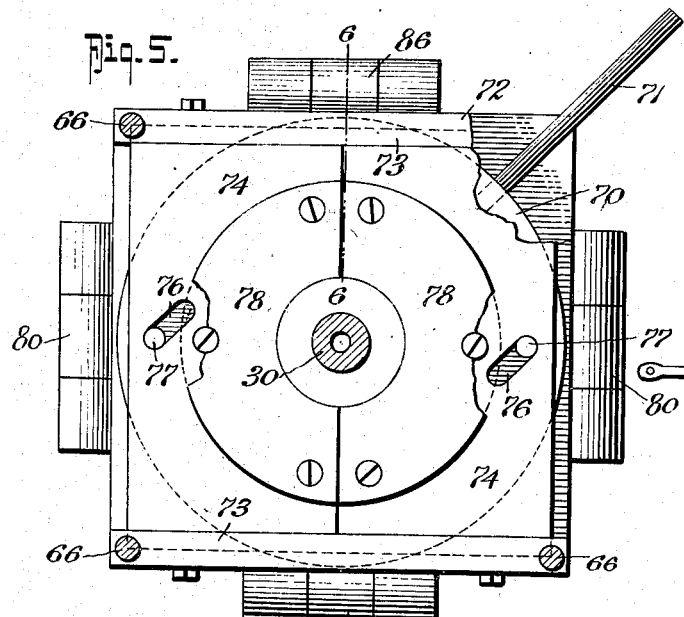
WITNESSES:
John J. Schrott
F. C. Gibson
INVENTOR
Christian Julius Koenig.
BY
Fred G. Dieterich
ATTORNEYS.

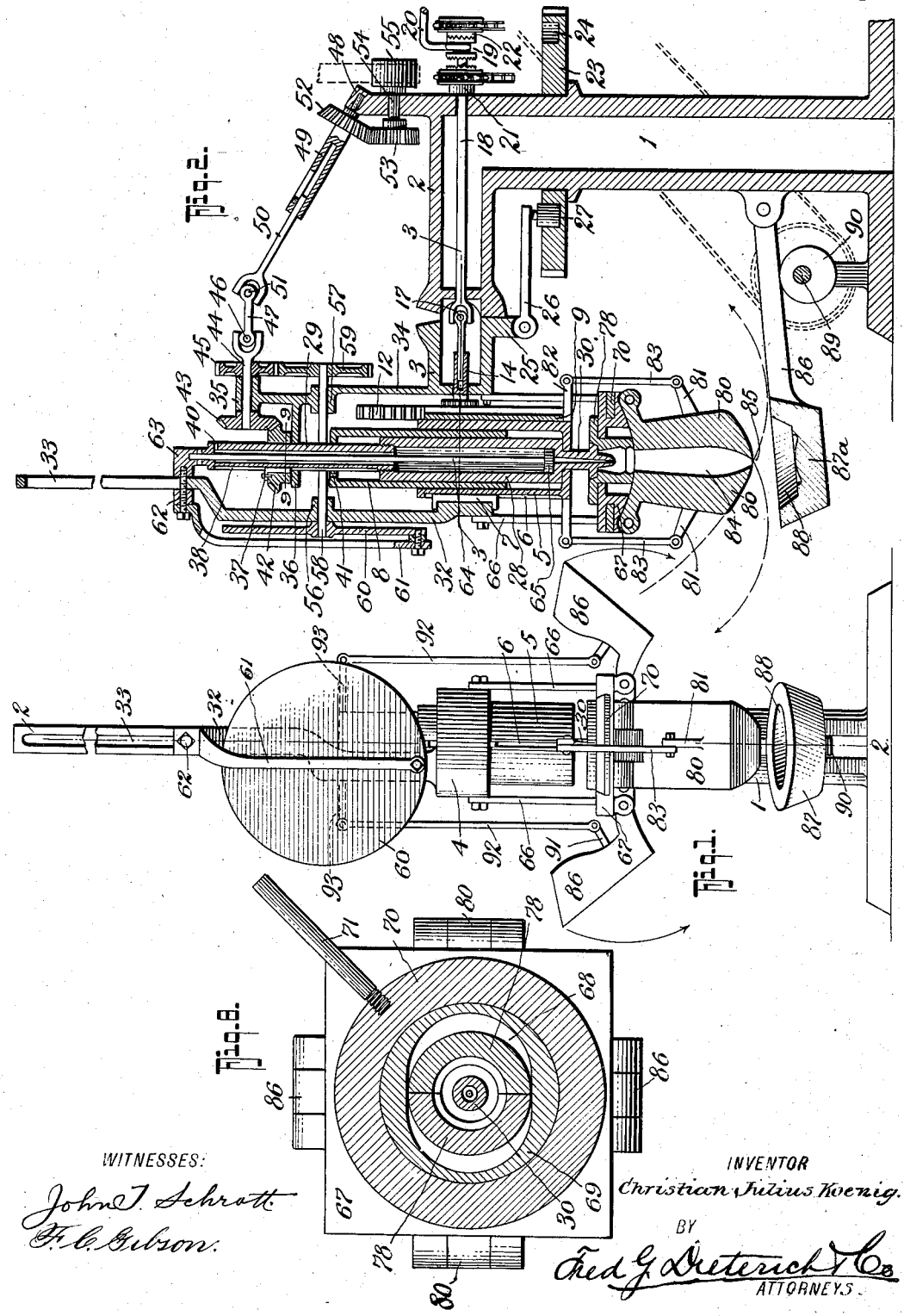

UNITED STATES PATENT OFFICE.

CHRISTIAN J. KOENIG, OF ALTON, ILLINOIS.

AUTOMATIC GLASS GATHERING AND BLOWING MACHINE.

No. 847,666.     Specification of Letters Patent.     Patented March 19, 1907.

Application filed October 20, 1905. Renewed January 24, 1907. Serial No. 353,907.

*To all whom it may concern:*

Be it known that I, CHRISTIAN J. KOENIG, a citizen of the United States, residing at Alton, county of Madison, Illinois, have invented certain new and useful Improvements in Automatic Glass Gathering and Blowing Machines, of which the following is a full, clear, and exact description.

The objects of my invention are, first, to provide a separable blank-mold and a separable blow-mold upon a single head and to alternately open and close said molds; second, to provide means whereby a partial vacuum is formed in the blank-mold when it is closed in order to draw molten glass into said mold by suction; third, to provide means for causing the parts of the blow-mold to close upon the glass blank after it is formed and to blow said blank into proper form in the blow-mold; fourth, to provide means whereby the mechanisms for carrying out the hereinbefore-mentioned operations are caused to automatically operate in proper sequence.

My invention consists in certain novel features of construction and arrangement of parts that will be hereinafter more fully set forth, pointed out in my claims, and illustrated in the accompanying drawings, in which—

Figure 1 is a front elevation of my improved machine. Fig. 2 is a vertical section taken on line 2 2 of Fig. 1. Fig. 3 is a horizontal section taken on line 3 3, Fig. 2. Fig. 4 is a vertical section taken transversely through the center of the neck-ring of my improved machine. Fig. 5 is a plan view of the neck-ring seen in Fig. 4. Fig. 6 is a detail section taken on line 6 6, Fig. 5. Fig. 7 is a vertical section taken vertically through the blow-mold and showing a bottle blown therein. Fig. 8 is a horizontal section taken on line 8 8, Fig. 4. Fig. 9 is an enlarged horizontal section taken on line 9 9, Fig. 2.

Referring by numerals to the accompanying drawings, 1 indicates a post provided at its upper end with a laterally-projecting arm 2. Hinged to the outer end of this arm, so as to swing vertically, is a frame 3, that is provided at its outer end with an integral horizontally-arranged ring 4. Arranged to slide vertically through this ring is a cylinder 5, that is provided with a vertically-arranged keyway 6, that receives the key 7, seated in the ring 4. Arranged to slide vertically in the cylinder 5 is an inner cylinder 8, with which is formed integral a vertically-arranged rib 9, that projects through a vertical slot 10, formed in the cylinder 5, and the outer end of this rib 9 is provided with a series of teeth 11, that form a rack. Bolted to the exterior of the cylinder 5 is a vertically-arranged rack 12, that is arranged directly opposite the rack formed on the rib 9, and both of said racks occupy positions within the frame 3 in front of the ring 4. Meshing with these racks is a pinion 13, that is carried on the forward end of a sleeve 14, that is journaled in a portion of the frame 3, and said sleeve is provided with a square aperture 15, in which is arranged to slide a short shaft 16. The rear end of this shaft 16 is connected by a universal joint 17 to the forward end of a shaft 18, that is arranged in suitable bearings formed in the ends of the arm 2. This universal joint is in direct alinement with the hinge between the arm 2 and the frame 3. A sliding clutch 19 is mounted on the outer end of the shaft 18, which clutch rotates with said shaft, and a suitable lever 20 is connected to said clutch for throwing it into engagement with clutch-faces formed on pinions 21 and 22, that are arranged for rotation on the shaft 18 and driven in different directions. This last-mentioned mechanism is for the purpose of reversing the rotation of the shaft 18. Mounted for rotation upon the post 1 a short distance below the arm 2 is a horizontally-arranged gear-wheel 23, that is suitably driven and which is provided in its top face with a cam-groove 24.

25 indicates an arm that projects downwardly from the frame 3 and to which is pivoted an arm 26, that carries a roller 27 on its rear end, which roller rides in the cam-groove 24.

The mechanism just described provides means for swinging the frame 3 and parts carried thereby vertically and outwardly from the end of the arm 2.

Arranged for vertical movement within the cylinder 8 is a small cylinder 28, that is provided at its upper end with a tubular extension 29, that projects some distance above the upper end of the cylinder 8. Formed integral with the lower end of this cylinder 28 is a downwardly-projecting tubular stem 30, that projects through the lower end of the outer cylinder 5 and which is provided adjacent its lower end with a flange 31. Formed integral with the front side of the ring 4 is an upwardly-projecting bracket 32, the extreme upper end of which is provided with a vertically-arranged slot 33. Formed integral with the top of the frame 3 and arranged opposite the bracket 32 is an upwardly-projecting bracket 34, and there being a horizontally-arranged bearing 35 formed at the upper end of said bracket. The upper end of the extension 29 has an exhaust-port 40, and a similar port 41 is formed in the upper end of the cylinder 8. The extension 29 is also formed with an external groove 38 to receive a key 37, which also engages a keyway in a beveled gear-pinion 42, that is supported by the arm 36, that projects from the bracket 34. The pinion 42, which rotates the tubular extension 29 and cylinder 28, meshes with a pinion 43, that is fixed upon the end of a horizontally-arranged shaft 44, rotatably mounted in the bearing 35. Fixedly mounted on the shaft 44 on the opposite side of the bearing 35 from the pinion 43 is a drive-gear 45, and the end of the shaft 44 adjacent this gear 45 is connected by a universal joint 46 to a link 47.

Formed integral with and extending upwardly from the rear end of the arm 2 is a bracket 48, and mounted for rotation in the upper end thereof is the lower end of an inclined tubular shaft 49. Arranged to slide in this shaft and to rotate therewith is a shaft 50, the upper end of which is connected by a universal joint 51 to the rear end of the link 47. Mounted on the lower end of the tubular shaft 49 is a beveled pinion 52, which meshes with a like pinion 53, carried by one end of a shaft 54, that is journaled in the bracket 48. Located upon the opposite end of this shaft is a belt-wheel 55, that is continuously driven. The mechanism just described provides means for continuously rotating the inner cylinder 28, that carries the stem 30. The brackets 32 and 34 are extended slightly to one side of the vertical plane occupied by the tubular extension 29, and formed in said brackets just below the arm 36 are the alined bearings 56 and 57. Arranged for rotation in these bearings is a horizontally-arranged shaft 58, on the rear end of which is fixed a pinion 59, that is in mesh with and driven by the pinion 45. Located on the forward end of this shaft 58 in front of the bracket 32 is a disk 60. Pivotally connected to a point adjacent the edge of this disk is the lower end of a connecting-rod 61, which extends upwardly, and passing through the upper end of said rod is a pin or bolt 62, that passes through the slot 33 and is seated in a block 63. This block is rigidly connected to the upper end of a rod 64, that extends downwardly through the tubular extension 29 and through the cylinder 28, the lower end of said rod being provided with a piston-head 65, that operates throughout the inner cylinder 28.

Fixed to and extending downwardly from the ring 4 is a plurality of rods 66, which are secured to the top of a rectangular block 67, that is arranged a short distance below the lower end of the inner cylinder 28. Formed through the center of this block 67 is an elongated opening 68, and extending upwardly from the top of said block is an annular flange 69. Arranged for rotation upon the block around this flange 69 is a ring 70, from which projects outwardly an operating-handle 71. Fixed to opposite sides of the block 67 is a pair of upwardly-projecting plates 72, the upper ends of which are provided with integral inwardly-projecting flanges 73. Arranged to slide on top of the ring 70 and between the flanges 73 is a pair of plates 74, the inner meeting edges of which are provided with semicircular cut-away portions 75, that form a circular opening immediately over the center of the opening 68. Formed in each one of these plates 74 is an inclined slot 76, into which project pins 77, that are seated in the ring 70. These slots 76 are arranged at the same angle and are so disposed as that when the ring 70 is slightly shifted the pins 77, riding in said slots, will cause the plates 74 to spread apart. Fixed to the tops of the plates 74 are the mating halves 78 of a neck-ring, that projects downwardly through the elongated opening 68, and which neck-ring is so formed on its inner face as to give the proper shape and contour to the upper portion of the neck of the bottle that is formed by my improved machine. The stem 30 projects downwardly into this neck-ring, and the flange 31 rests upon a correspondingly-formed annular recess 79, that is formed in the top of the mating parts forming said ring.

Hinged to opposite sides of the under side of the block 67 are the mating halves of a blank-mold 80, and formed integral with the outer faces of the halves of this blank-mold are the arms 81. Projecting outwardly from opposite sides of the lower end of the cylinder 5 is a pair of arms 82, and connecting the outer ends of these arms with the outer ends of the arms 81 are the rods 83. The inner meeting surfaces of the mating halves of the blank-mold 80 are formed with elongated recesses 84, that together form a circular recess in which the blank is formed that is later blown into the form of a bottle by my improved machine. The lower ends of these recesses 84 extend to the lower ends of the halves of the blank-mold, so as to form a small opening 85 at said lower end. Hinged to the opposite sides of the lower end of the block 67 are the mating halves 86, that form the blow-mold, and recesses 87 are formed on the inner faces of these mating halves 86, in which the bottle is blown. The upper ends of the halves of the blow-mold and of the halves of the blank-mold are formed to fit the under side of the block 67 and also to fit against the lower end of the mating halves of the neck-ring. Hinged to the lower portion of the post 1 is a forwardly-projecting arm 86, that is provided at its outer end with a block 87ª, in the top of which is formed a recess 88, that is constructed to fit the lower ends of the halves 86 of the blow-mold. A shaft 89 is transversely arranged for rotation beneath the arm 86, and said shaft carries a cam 90, that bears against the under side of said arm 86. As the shaft 89 is rotated the cam moves the arm 86 upwardly and brings the block 87ª upwardly against the lower ends of the mating halves of the blow-mold. Formed integral with and extending outwardly from the outer faces of the blow-molds are the arms 91, to which are secured the lower ends of vertically-arranged connecting-rods 92. The upper ends of these rods 92 are pivotally connected to the outer ends of short arms 93, that are fixed to and project outwardly from the upper end of the cylinder 8, and which arms 93 are arranged at right angles to the arms 82.

My improved machine, constructed as described, is located adjacent a glass-furnace and is arranged so that when the frame 3, ring 4, and parts carried thereby are swung vertically the lower ends of the halves 80 of the blank-mold will dip into the molten glass within the glass-furnace. The rotation of the gear-wheel 23, having the cam-groove 24 therein, moves the arm 26 outwardly, and consequently swings the frame 3 upon its hinge, and thus shifts the entire mechanism carried by said frame out of a vertical plane, and when the lower ends of the halves of the blank-mold dip into the molten glass the piston 65 starts to move upwardly, it being carried by the piston-rod 64, block 63, which are elevated by the vertical movement of the connecting-rod 61, moved by the rotation of the disk 60, which is driven by the meshing of the pinion 45 with the pinion 59. The shaft 54 rotates constantly, and the pinions 53 and 52 and intermediate connections impart continuous rotary motion to the shaft 44, on which is mounted the bevel-pinion 43, and this latter pinion in turn imparts a continuous rotary motion to the pinion 42, together with the tubular extension 29 and the inner cylinder 28. The elevating of the piston 65 within the cylinder 28 creates a partial vacuum within the opening in the blank-mold, and as a result said opening will be filled with molten glass, and during the time this molten glass is in said blank-mold the stem 20 will be rotating in the upper end of the neck-ring. When the piston 65 strikes the upper end of the inner cylinder 28, it will move said cylinder and the stem 30 upwardly until it strikes against the upper end of the cylinder 8, and this upward movement of said cylinder 28 will withdraw the lower end of the stem from the neck-ring, and as a result air will enter through the hollow stem and fill the lower portion of the cylinder 28. The rotation of the gear-wheel 23 now returns the frame 3 to its horizontal position, and consequently the various parts carried in the ring 4 are returned to their vertical positions. The sliding clutch 19 is now moved by the lever 20, so that the proper rotary motion is imparted to the shaft 18 to cause the pinion 13 to so rotate as that the cylinder 5 and rack 11 carried thereby are elevated, while the cylinder 8 and rack carried thereby are moved downwardly. This movement through the connections 81, 82, and 83 swing the mating halves 80 of the blank-mold upwardly and outwardly away from the glass-blank, which is held supported by the neck-ring and at the same time the downward movement of the cylinder 8 through the connections 91, 92, and 93 move the mating halves of the blow-mold downwardly together beneath the block 67 around the glass-blank. The mating halves of the blank-mold and of the blow-mold are so arranged and hinged as that they open and close alternately, and said mating halves swing as indicated by the dotted lines and arrows in Figs. 1 and 2. As soon as the blow-mold closes around the glass-blank the piston 65 starts downwardly on its return movement, being actuated by the rotation of the disk 60 and the parts moved thereby, and the air that was previously drawn into the cylinder 28 will now be forced out through the hollow stem and will blow the bottle in the blow-mold. Previous to this blowing operation or as soon as the halves of the blow-mold come together the cam 90 elevates the arm 86 and brings the block 87ª upwardly against the under side of the blow-mold, (see Fig. 7,) and thus when the bottle is blown it rests upon the center of this block 87ª. The sliding clutch 19 is now reversed, and consequently a reverse rotary motion is imparted to the shaft 18, and as a result the cylinder 8 is moved upwardly and at the same time the cylinder 5 moves downwardly. Before this operation takes place the operator engages the handle 71, shifts the ring 70, and by so doing separates the plates 74, and consequently separating the mating halves 78 of the neck-ring, so that the bottle is detached from said neck-ring, and it may now be removed from the block 87ª before the mating halves of the blank-mold again swing downwardly into a closed position. The various parts are now ready for another operation, and as the various driving mechanisms operate continuously the movements, as hereinbefore described, take place in regular sequence.

The discharge-apertures 40 and 41 allow discharge of the air from the upper ends of the tubular extension 29 and the cylinder 5 when the piston 65 and the inner cylinder 28 move upwardly. The universal joints 46 and 51 and the shaft 50, operating in a sliding sleeve 49, permit the upper portion of the mechanism carried by the frame 3 to move rearwardly when the lower end of said mechanism moves outwardly, and at the same time continuous rotary motion is imparted to the pinions 42 and 43, which results in a continuous rotation of the stem 30 in the upper end of the glass blank and bottle. The sliding clutch 19 and the oppositely-driven sprocket-wheels 21 and 22 provide means for imparting alternate reverse rotary motion to the shaft 18. When one set of the molds is closed beneath the block 67, the opposite mold, or rather the mating halves thereof, swing upwardly into an out-of-the-way position. These molds are alternately opened and closed by the vertical movements of the cylinders 5 and 8, which are actuated by the engagement of the pinion 13 with the racks 11 and 12.

My improved machine is comparatively simple, is adapted for the manufacture of all classes of bottles and similar articles, is practically automatic in all its operations, and is entirely automatic in the gathering of the glass into the blank-mold.

I claim—

1. In a machine of the class described, a frame, a block carried thereby, separable blank and blow molds hinged to the under side of said block, means whereby the parts of said molds are alternately opened and closed in pairs, means whereby a partial vacuum is created in the blank-mold when the same is closed to fill said mold with molten glass, and which means by its reverse motion blows the glass-blank in the blow-mold and a block adapted to fit against the under side of the blow-mold when the same is closed, substantially as specified.

2. In a machine of the class described, a frame, a block carried thereby, a separable blank and blow molds hinged to the under side of said block, means whereby the parts of said molds are alternately opened and closed in pairs and a block having a recess in its top adapted to fit against the under side of the blow-mold when the same is closed, substantially as specified.

3. In a machine of the class described, a frame, a block carried thereby, a separable blank and blow molds hinged to the under side of said block, means whereby the parts of said molds are alternately opened and closed in pairs, a block having a recess in its top adapted to fit against the under side of the blow-mold when the same is closed, and means whereby said block is elevated when the blow-mold is closed, substantially as specified.

4. In a machine of the class described, a frame arranged to swing vertically, a block carried thereby, separable blank and blow molds hinged to the under side of said block, a separable neck-ring arranged in the top of said block and a block having a recess in its top adapted to fit against the under side of the blow-mold when the same is closed, substantially as specified.

5. In a machine of the class described, a frame, a block supported thereby, a separable neck-ring arranged in the top of said block, separable blank and blow molds hinged to the under side of the block, means whereby the parts of said molds are alternately swung upwardly, means whereby the parts of the neck-ring are separated and a block having a recess in its top adapted to fit against the under side of the blow-mold when the same is closed, substantially as specified.

6. In a machine of the class described, a frame, a block carried thereby, separable blank and blow molds hinged to the under side of the block, means arranged above the block for creating a partial vacuum in the blank-mold to fill the same with molten glass and which last-mentioned means by its reverse motion blows the glass-blank in the blow-mold and a block having a recess in its top adapted to fit against the under side of the blow-mold when the same is closed, substantially as specified.

7. In a machine of the class described, a frame a block carried thereby, a separable neck-ring arranged in said block, a blowing-stem projecting through said neck-ring separable blank and blow molds hinged to the under side of the block and a block having a recess in its top adapted to fit against the under side of the blow-mold when the same is closed, substantially as specified.

8. In a machine of the class described, a frame, a block carried thereby, a separable neck-ring arranged in said block, a blowing-stem projecting through the neck-ring, means whereby said stem is continuously rotated, separable blank and blow molds hinged to the under side of the block and a block having a recess in its top adapted to fit against the under side of the blow-mold when the same is closed, substantially as specified.

9. In a machine of the class described, a frame arranged to swing vertically, a block carried thereby separable blank and blow molds hinged to the under side of said block, a block having a recess in its top adapted to fit against the under side of the blow-mold when the same is closed, a suction device vertically arranged for rotation above the first-mentioned block, means whereby said suction device is operated when the frame is swung vertically and means whereby the suction device is reversed in operation when the frame returns to its vertical position, substantially as specified.

10. In a machine of the class described, a frame, a block carried thereby, separable blank and blow molds hinged to the under side of said block, means whereby the parts of said molds are alternately closed and opened in pairs, means whereby a partial vacuum is created in the blank-mold when the same is closed to fill said mold with molten glass and which means by its reverse motion blows the glass-blank in the blow-mold, means whereby the frame is swung vertically at the time the blank-molds are closed and a block provided with a recess in its top adapted to fit against the under side of the blow-mold when the same is closed, substantially as specified.

11. In an apparatus for the manufacture of hollow glass articles, the combination with a mold; of a means coöperating with the mold which, under one movement operates to create a partial vacuum in the mold whereby to fill it under atmospheric pressure and which under another movement forces the exhausted air back into the mold for blowing the glass.

12. In a glass-shaping machine, the combination of a sectional parison-mold adapted to be dipped into a mass of molten glass, a means that first exhausts the air from the mold when dipped, whereby to fill the mold, and then blows the parison to the desired form.

13. In a machine of the character described, the combination of a forming-head, a mechanism for bringing the forming-head into operative relation to a mass of molten glass, means for first moving the glass from the mass into the forming-head whereby to fill the same and then blowing the filling whereby to expand the filling to the desired shape.

14. In a machine of the character described, a head having a blank-mold and a body-mold connected thereto, means for moving the blank-mold into operative relation to the body of molten glass, a pump operating under one movement to fill the blank-mold by air-pressure and under another movement to blow the parison thus formed in the body-mold.

15. In a machine of the character described, the combination of a neck-ring, a parison and a blowing mold coöperatively connected therewith, means for gathering the proper amount of metal for the article and forming the parison by forcing the glass under atmospheric pressure into the parison-mold and then blowing the said parison, as set forth.

16. A machine of the character described, comprising a mold-section open at the bottom and adapted to be moved into operative relation to a mass of molten glass, and means connected with the mold adapted under one movement to fill the mold by exhausting the air therefrom, and under another movement, to return the exhausted air under pressure whereby to blow the article into form.

17. The combination of a mold forming a holder for the parison, means for first filling the mold by gathering the material directly from the molten mass into the said holder, the same means then serving for subsequently shaping the parison while supported thereby.

18. The combination in a machine as described, with a mold having means for supporting the blanks when formed therein; of a means for directly filling the mold by gathering from the mass of molten glass under the operation of a vacuum and then compressing air within the vacuum and blowing it into the gathering whereby to blow it to its finished form while held by the supporting means.

19. In an apparatus for the manufacture of hollow glass articles, the combination of a mold comprising two independent pairs of sections, one of which serves as a parison-mold, the other set of which serves as a blowing or final-forming mold, a mechanism for alternately moving the two sets of sections into an operative position, and means, which under one operation draws the molten glass into the parison-mold when it is in its operative position, and which, under another operation, blows the parison when the final-forming-mold sections are in their operative position.

20. In an apparatus for the manufacture of hollow glass articles, the combination of a parison or fore-form mold and a final or true form mold, the two molds being coöperatively connected, and means adapted under one operation to draw the molten glass into the fore-form mold by suction action and then blowing the parison filling contained within the final-form-mold sections by forcing air therein.

21. In a machine of the character described, a single automatic mechanism adapted under one operation to gather the glass and shape it into a blowing-blank and under another operation to subsequently blow the blank.

22. In a glass-shaping means, the combination of a blank-mold and a blowing-mold, of mechanism for automatically inclosing the blank-form in the blank-mold for the blowing-mold, and means operated under one movement for gathering the glass into the blank-mold and under another movement adapted for expanding the blank when surrounded by the blowing-mold.

23. In a glass-shaping machine of the character described, a pump coöperatively connected with the blank-mold and the blowing-mold, adapted under one movement to create a partial vacuum for gathering the glass and shaping it in the blank-mold and under another movement to compress the air contained in the partial vacuum and force the same in the blank.

24. A glass gathering and shaping means, comprising an adjustable mold adapted under one adjustment to initially form the blank, said mold being open at the bottom and an air-controlling means connected with the mold, adapted under one operation to exhaust the air from the mold and fill it by suction and under another operation to expand the filling to its final shape by blowing the air under pressure therein.

CHRISTIAN J. KOENIG.

Witnesses:
ALBERT E. BASSETT,
KIRKE H. TAYLOR.